United States Patent
Nylander et al.

(10) Patent No.: US 7,266,106 B2
(45) Date of Patent: Sep. 4, 2007

(54) FRAME SIZE ADAPTATION IN REAL-TIME TRANSPORT PROTOCOL

(75) Inventors: Tomas Nylander, Stavsnäs (SE); Jari Tapio Vikberg, Järna (SE); Tomas Bornefall, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 10/977,684

(22) Filed: Oct. 29, 2004

(65) Prior Publication Data

US 2006/0045057 A1    Mar. 2, 2006

Related U.S. Application Data

(63) Continuation-in-part of application No. 10/969,375, filed on Oct. 20, 2004.

(60) Provisional application No. 60/606,044, filed on Aug. 31, 2004.

(51) Int. Cl.
    *H04Q 7/24* (2006.01)
(52) U.S. Cl. ............ 370/338; 370/229; 370/470; 370/473; 370/476
(58) Field of Classification Search .......... 370/338, 370/229, 470, 473, 476
    See application file for complete search history.

(56) References Cited

U.S. PATENT DOCUMENTS

| 6,937,573 | B2 * | 8/2005 | Chan et al. ............... 370/252 |
| 2001/0015956 | A1 * | 8/2001 | Ono ........................... 370/229 |
| 2003/0091017 | A1 * | 5/2003 | Davenport et al. ......... 370/338 |
| 2005/0272449 | A1 * | 12/2005 | Gallagher et al. .......... 455/458 |

* cited by examiner

*Primary Examiner*—George Eng
*Assistant Examiner*—Huy Phan (57) ABSTRACT

A method of adapting payload transport between a mobile station (MS) and an unlicensed-radio access network controller (UNC) using the Real-Time Transport Protocol (RTP). During the activation of a traffic channel, the UNC and MS negotiate an initial sample size for the payload to be carried in each RTP packet. Thereafter, if network conditions change to the point that a different sample size is needed, another negotiation is initiated to change the sample size for the ongoing session. The UNC may suggest a sample size, and the MS selects the closest sample size that the MS can support and uses the selected sample size in RTP packets that it sends to the UNC. The UNC checks the received RTP packets and automatically adopts the sample size utilized by the MS. The UNC and MS may also negotiate changes to redundancy coding and other parameters that affect voice quality.

22 Claims, 8 Drawing Sheets

| IEI | Information Element | Type/Reference | Presence | Format | Length | Value | Notes |
|---|---|---|---|---|---|---|---|
| | Length Indicator | Length Indicator 11.1.1.1 | M | V | 2 | | |
| | UMA RR Protocol Discriminator | Protocol Discriminator 11.1.1.2 | M | V | 1/2 | 0001 | |
| | Skip Indicator | Skip Indicator 11.1.1.3 | M | V | 1/2 | 0000 | |
| | URR ACTIVATE CHANNEL message identity | Message Type 11.1.1.4 | M | V | 1 | | |
| 27 | Channel Mode | Channel Mode 11.2.27 | M | TLV | 3 | | |
| 53 | Sample Size | Sample Size 11.2.53 | M | TLV | 3 | | CS payload sample size in ms |
| 97 | IP Address | IP Address 11.2.9 | M | TLV | 6 | | |
| 104 | RTP UDP Port | Communication Port 11.2.25 | M | TLV | 4 | | |
| 54 | Payload Type | Payload Type 11.2.54 | O | TLV | 3 | | |
| 55 | Multi-rate Configuration | Multi-rate Configuration 11.2.55 | C | TLV | 3-n | | |
| 105 | RTCP UDP Port | Communication Port 11.2.25 | O | TLV | 4 | | |

Sample Size (octet 3)

20    20 ms of CS payload included in each RTP/UDP packet
   40    40 ms of CS payload included in each RTP/UDP packet
   60    60 ms of CS payload included in each RTP/UDP packet
   80    80 ms of CS payload included in each RTP/UDP packet All other values are undefined in Release 1.

FRAME SIZE ADAPTATION IN REAL-TIME TRANSPORT PROTOCOL

RELATED APPLICATIONS

This application is a continuation-in-part of U.S. patent application Ser. No. 10/969,375 entitled, Frame Size Adaptation in Real-Time Transport Protocol, filed Oct. 20, 2004, which claims priority on U.S. Provisional Application No. 60/606,044, entitled, Frame Size Adaptation in Real-Time Transport Protocol, filed Aug. 31, 2004.

FIELD OF THE INVENTION

The present invention relates to the transmission of synchronized data, such as voice data, over an IP network. In particular, and not by way of limitation, the invention is directed to a system and method for adapting circuit-switched (CS) payload transport between a mobile station and an unlicensed-radio access network utilizing the Real-Time Transport Protocol (RTP).

BACKGROUND ART

When voice data is transported over an IP network, the chosen transport protocol is generally the Real-Time Transport Protocol (RTP). This protocol is conventionally used to transport different kinds of synchronized media, such as video or voice coded with different codecs. RTP is carried over the User Datagram Protocol (UDP). For this reason, the end points of an active voice session using RTP are generally identified using an IP address, i.e. network address, and a UDP port or transport level identifier. The use of RTP enables one or more speech samples to be carried in one RTP package.

The Unlicensed Radio service utilizes an unlicensed radio band to support mobile telecommunication systems operating in licensed radio bands. For example, the Unlicensed Radio service may support Global System for Mobile Communications (GSM) circuit-switched services and GSM Packet Radio Service (GPRS) packet-switched services.

A packet-switched voice session is set-up using a signaling protocol, such as the Session Initiation Protocol (SIP), H-323 or another proprietary or standard protocol. During set-up of the voice session, each party signals to the other party the identifiers that have been locally selected for the voice session.

When a circuit switched call (speech or data) is set up, the network controller specifies the number of speech/data frames that must be used in each RTP package. This is specified as the sample size for the RTP package (which can be converted to a number of 20 ms voice/data samples). If the MS cannot support this requirement, the MS cannot proceed, and the call is terminated.

This problem can be avoided by specifying that a greater number of speech/data frames be used in each RTP package. This enables less capable MSs to proceed with call setup. A disadvantage is that the greater number of speech/data frames in each RTP package increases the delay in the transmission between the MS and the network controller. Thus, the system must be set up either for low delay (some MSs cannot be served) or for higher delay (high performance MSs unnecessarily have higher round trip delay).

Additionally, once a session has begun, there are no procedures for changing the sample size during the ongoing session in order to adapt to changing network conditions.

It would be advantageous to have a system and method that overcomes the disadvantages of the existing methodology. The present invention provides such a system and method.

SUMMARY OF THE INVENTION

The present invention individually serves MSs with different capabilities by adapting the circuit-switched (CS) payload transport between each individual MS and an unlicensed-radio access network controller (UNC). This is done by initially negotiating the number of speech/data frames per RTP package during the activation of a traffic channel. Thereafter, if network conditions change to the point that a different sample size is needed, another negotiation is initiated to change the sample size for the ongoing session. In one embodiment, the UNC suggests a sample size, and the MS selects the closest sample size that the MS can support and uses the selected sample size in RTP packets that it sends to the UNC. The UNC checks the received RTP packets and automatically adopts the sample size utilized by the MS.

Thus, in one aspect, the present invention is directed to a method of adapting payload transport between a mobile station and an unlicensed-radio access network controller utilizing a packet-based transmission protocol. The method includes the steps of (a) establishing an ongoing session between the mobile station and the access network controller, wherein the mobile station and the access network controller utilize an initial sample size of the payload to be included in each packet; (b) detecting by either the mobile station or the access network controller, a change in network performance related to the ongoing session; (c) in response to the detected change in network performance, negotiating a new sample size between the access network controller and the mobile station; and (d) utilizing the new sample size by the mobile station and the access network controller for the ongoing session. The method may also include (e) determining that redundancy coding should be applied to the packets, or that redundant packets should be transmitted, in response to the detected change in network performance; and (f) applying redundancy coding, or transmitting redundant packets, for subsequent packets transmitted during the ongoing session.

In another aspect, the present invention is directed to a mobile station adapted to access an unlicensed-radio access network controller utilizing a packet-based transmission protocol. The mobile station includes means for establishing an ongoing session with the access network controller utilizing an initial sample size of a payload to be included in each packet; means for negotiating a new sample size with the access network controller in response to a change in network performance related to the ongoing session; and means for utilizing the new sample size for the ongoing session.

In another aspect, the present invention is directed to an unlicensed-radio access network controller adapted to establish an ongoing session with a mobile station utilizing a packet-based transmission protocol. The controller includes means for determining an initial sample size of a payload to be included in each packet; means for negotiating a new sample size with the mobile station in response to a change in network performance related to the ongoing session; and means for utilizing the new sample size for the ongoing session.

In yet another aspect, the present invention is directed to a method of adapting payload transport between a mobile station and an unlicensed-radio access network controller utilizing a packet-based transmission protocol. The method includes the steps of negotiating during channel activation, an initial sample size of the payload to be included in each packet; monitoring network performance during an ongoing session between the mobile station and the access network controller; and upon detecting a change in network performance, negotiating a new sample size.

BRIEF DESCRIPTION OF THE DRAWINGS

Further objects and advantages of the present invention will become apparent from the following description of the preferred embodiments that are given by way of example with reference to the accompanying drawings wherein.

DETAILED DESCRIPTION OF EMBODIMENTS

Figure 1:
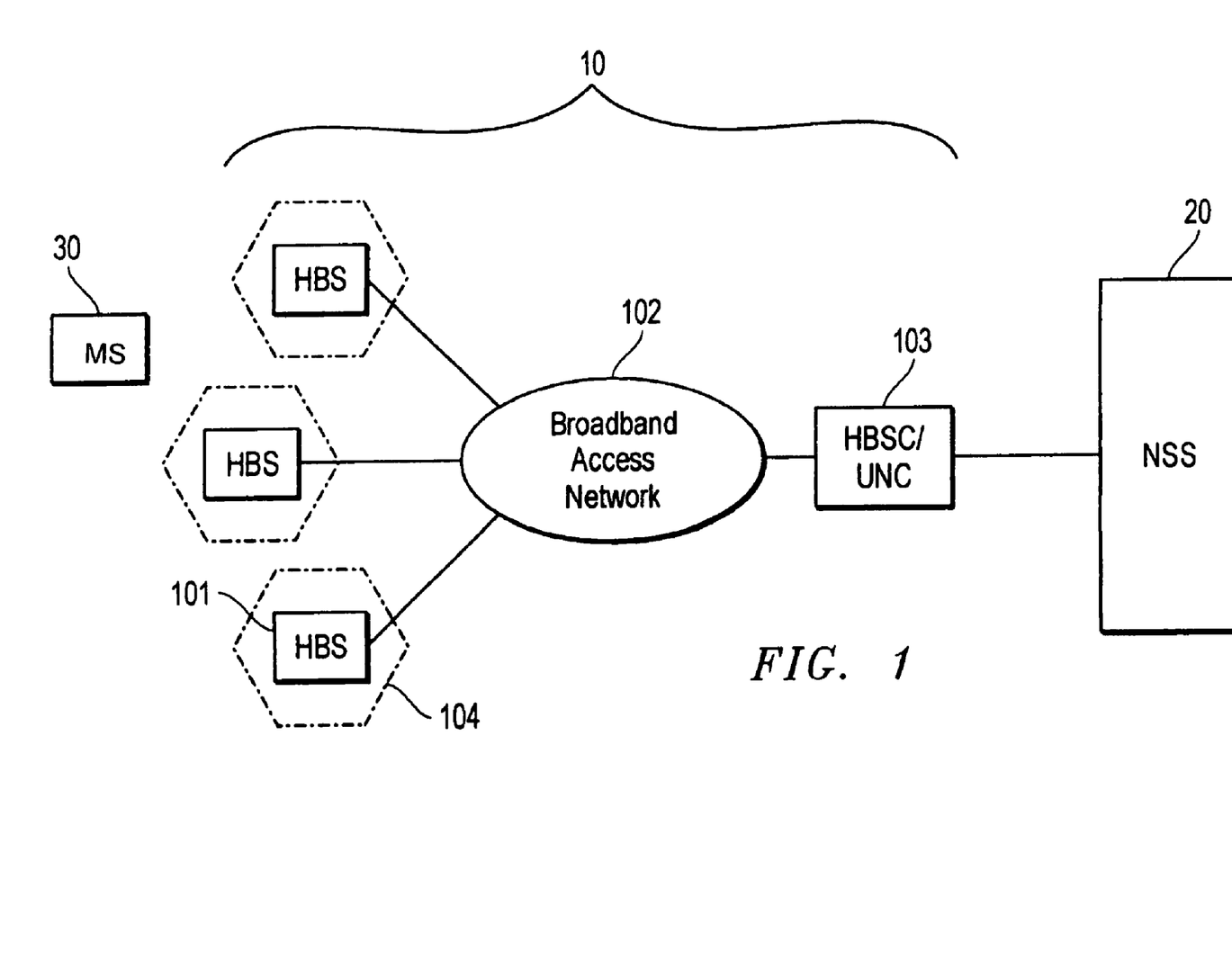
FIG. 1 is a simplified block diagram of an unlicensed-radio access network suitable for implementing the present invention.

FIG. 1 is a simplified block diagram of an unlicensed-radio access network suitable for implementing the present invention. The unlicensed-radio access network enables mobile stations to communicate with the core network portion of a conventional mobile communications network, such as a GSM network, and through this other communication networks, via an unlicensed-radio interface. The term "unlicensed-radio" means any radio protocol that does not require the operator running the mobile network to have obtained a license from the appropriate regulatory body. In general, such unlicensed-radio technologies must be low power and thus of limited range compared to licensed mobile radio services. A benefit of this lower power is that the battery lifetime of mobile stations is greater. Moreover, because the range is limited the unlicensed-radio may be a broadband radio, thus providing improved voice quality. The radio interface may utilize any suitable unlicensed-radio protocol, for example a wireless LAN protocol, Digital Enhanced Cordless Telecommunications (DECT), or Bluetooth radio.

The access network 10 comprises an access controller, hereinafter referred to as a home base station controller HBSC or more generally, an Unlicensed-radio Network Controller (UNC) 103, which communicates with the core network portion of a conventional cellular mobile communications network NSS 20 over standard interfaces, such as the A- or Gb-interface for a GSM cellular network. The UNC 103 is connected to a plurality of access points or home base stations (HBS) 101 via a broadband packet-switched network 102. The packet-switched network 102 may be a dedicated private network or part of an already existing network, preferably with access to the Internet. The packet-switched network may be connected to various other devices and nodes, and may also access other private and public networks. The HBSs are adapted to communicate across an unlicensed-radio interface with mobile stations/terminals 30 and to this end, comprise radio transceivers that define a coverage area or cell 104 in a similar manner to the operation of a conventional base station transceiver.

The HBSs 101 may be dedicated entities in the access network 10 that are registered with the UNC 103 and are capable of establishing a connection with a mobile station 30 independently of a connection with the UNC. Alternatively, the HBSs may serve as access points to the unlicensed-radio access network 10 that are essentially transparent to both mobile stations 30 and the UNC. In this latter case, a mobile station 30 establishes a connection directly with the UNC across the broadband packet-switched network 102 and vice versa. Both the UNC and the HBSs have a network address on the broadband network. During the set up of a voice session between these two nodes, each node allocates a network address as a source address for receiving voice data, and communicates this to the other node. This address is then conventionally used by the receiving node as the destination address for the synchronized data stream in the opposite direction.

The broadband packet-switched network 102 carries data between the various nodes, i.e. the HBSs 101 and the UNC 103 using the Internet Protocol (IP). Voice data is carried over the network using the Real-Time Protocol (RTP) over User Datagram Protocol UDP over IP. RTP is commonly used on top of IP to transport different kinds of synchronized media data, such as video, voice (encoded using different codecs), or music. The network source address for the synchronized data in a voice session includes both an IP-address and a UDP port, which is the transport level identifier.

Figure 2:
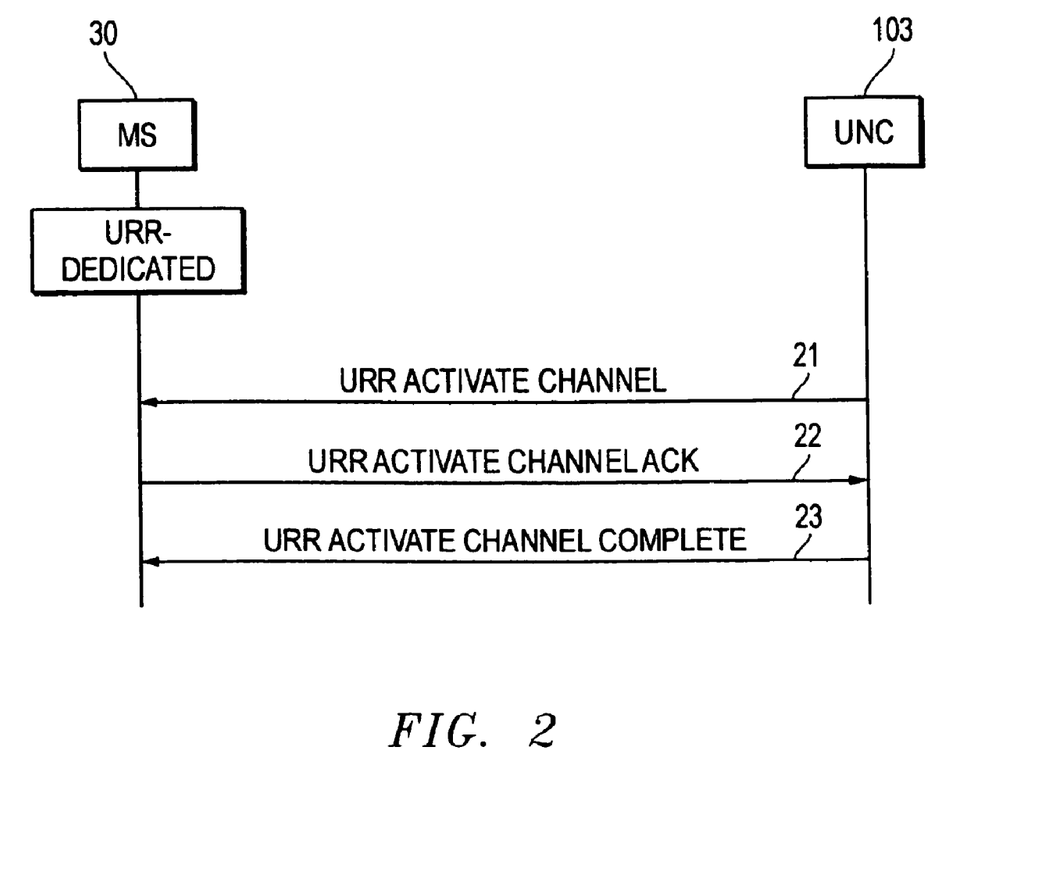
FIG. 2 is a signaling diagram showing the signaling messages sent between the MS and the Unlicensed Radio Network Controller (UNC) during traffic channel activation.

FIG. 2 is a signaling diagram showing the signaling messages sent between a URR-dedicated MS 30 and the UNC 103 during traffic channel activation. The Channel Assignment procedure is always initiated by the network. Upon receiving an Assignment Request from a Mobile Switching Center (MSC) (not shown), the UNC configures a traffic channel by transmitting a URR ACTIVATE CHANNEL message 21 to the MS 30. The URR ACTIVATE CHANNEL message can be sent to the MS only when the MS is in URR-DEDICATED state.

Figure 3:
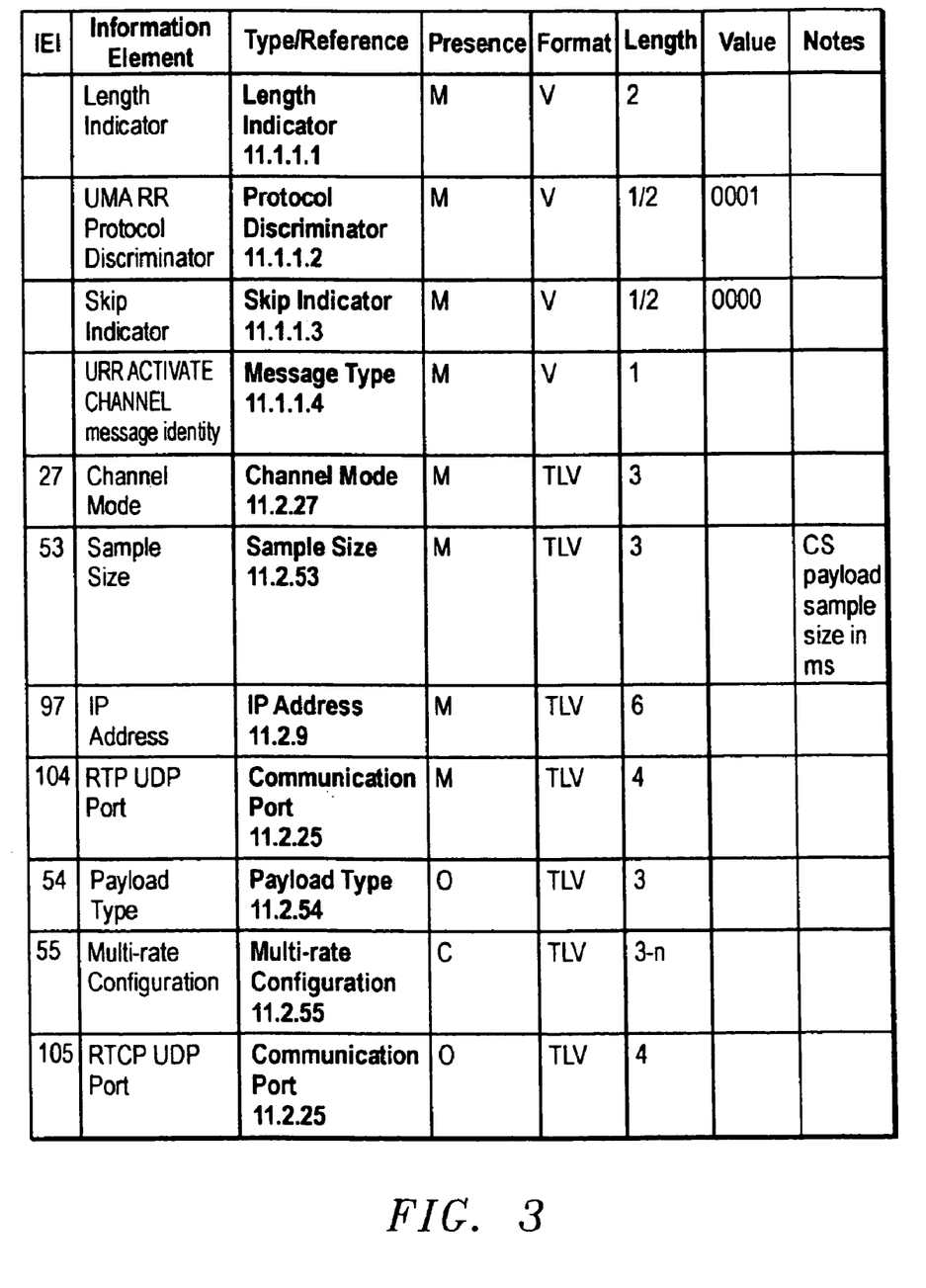
FIG. 3 is a chart showing the content of the URR ACTIVATE CHANNEL message.

FIG. 3 is a chart illustrating the various information elements (IEs) of the URR ACTIVATE CHANNEL message 21.

Referring to FIGS. 2 and 3, the remainder of the traffic channel assignment procedure will be described. Using existing RTP procedures, the URR-dedicated MS 30 responds to the received URR ACTIVATE CHANNEL message 21 as follows:

Code and decode the CS payload samples according to the IE "Channel Mode";

Use the value of the IE "Sample Size" as the sampling size for the coding and decoding of the CS payload samples;

Configure the uplink CS payload stream to be transmitted to the UDP port identified by the IE "UDP Port";

Configure the uplink CS payload stream to be transmitted to the IP address identified by the IE "IP address";

If received, use the configuration included in the IE 'Multi-rate Configuration' for the CS payload stream;

If received, use the Payload Type included in the IE 'Payload Type' for the PT field in the RTP header for the CS payload stream;

On successful activation of the channel:

Transmit a URR ACTIVATE CHANNEL ACK message 22 and include the UDP port number in the IE 'UDP Port" for the downlink CS payload stream to be used by the UNC; and If the IE 'RTCP UDP Port' was received in the URR ACTIVATE CHANNEL message and the MS is capable of supporting RTCP, activate the uplink RTCP stream and include the IE 'RTCP UDP Port' for the downlink RTCP stream to be used by the UNC.

Thereafter, the UNC 103 configures itself for transmission of RTP packets to the MS 30. The UNC then transmits a URR ACTIVATE CHANNEL COMPLETE message 23 to the MS.

Figure 4:
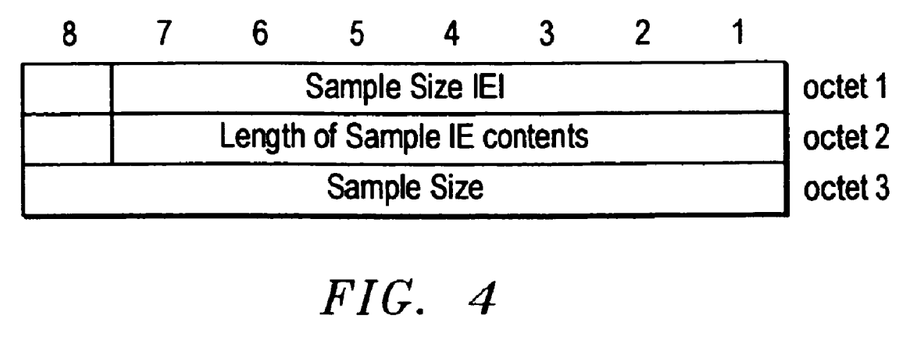
FIG. 4 is a chart of the Sample Size information element (IE)

FIG. 4 is a chart of the Sample Size information element (IE). The Sample Size IE is used by the network in the URR ACTIVATE CHANNEL message 21 to indicate the size of the CS payload frames to be included in each RTP/UDP packet.

Figure 5:
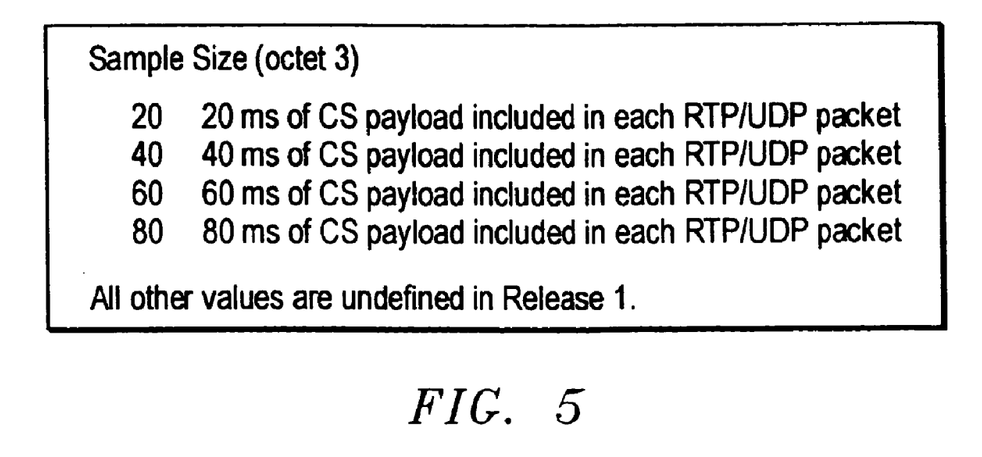
FIG. 5 is a table showing various values of Sample Size that may be selected by the MS according to the present invention.

FIG. 5 is a table showing various values of Sample Size that may be selected by the MS according to the present invention. The Sample Size may vary, for example, in 20-ms steps from 20 ms to 80 ms of CS payload included in each RTP/UDP packet.

If the MS 30 fails to establish the channel indicated in the URR ACTIVATE CHANNEL message 21, the MS transmits a URR ACTIVATE CHANNEL FAILURE message (not shown) to the UNC 103 and thereafter acts as if the URR ACTIVATE CHANNEL message was not received.

The present invention causes the MS 30 to interpret the "Sample Size" IE, not as an absolute requirement from the network, but rather as a minimum sample size acceptable to the network for the coding and decoding of the CS payload samples. Thus, rather than forcing the MS to use the value of the "Sample Size" IE as the sampling size for the coding and decoding of the CS payload samples, the MS has the option to accept the minimum sample size or to select a larger sample size for the connection. High performance MSs can accept the minimum sample size and thus avoid the higher round trip delay inherent in larger sample sizes. Likewise, lower performance MSs can select a larger sample size. When the UNC 103 detects that an MS has selected a larger sample size, the UNC also begins using the larger sample size in transmissions to the MS. Thus lower performance MSs are not being precluded from channel assignment, and can proceed with the call.

Figure 6:
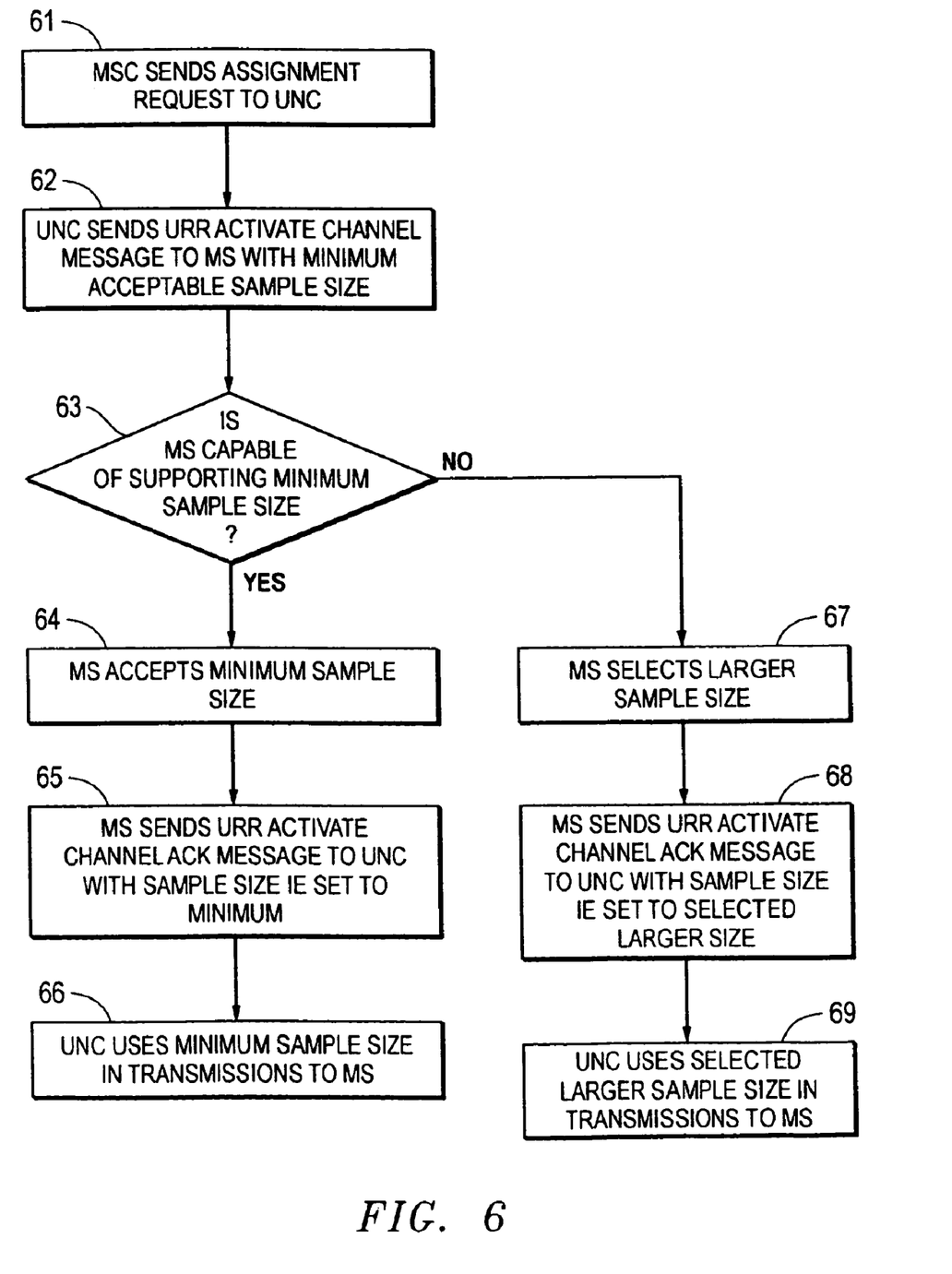
FIG. 6 is a flow chart illustrating the steps of a first exemplary embodiment of a method of initial sample size assignment during channel activation.

FIG. 6 is a flow chart illustrating the steps of a first exemplary embodiment of a method of initial sample size assignment during channel activation. At step 61, an MSC sends an Assignment Request message to the UNC 103. At step 62, the UNC sends a URR ACTIVATE CHANNEL message to a URR-dedicated MS 30, and includes a minimum acceptable Sample Size. At step 63, the MS determines whether it is capable of supporting the minimum Sample Size included in the URR ACTIVATE CHANNEL message. If so, the MS accepts the minimum Sample Size at step 64 and sends a URR ACTIVATE CHANNEL ACK message to the UNC at step 65. The URR ACTIVATE CHANNEL ACK message includes a Sample Size IE set to the minimum Sample Size. Thereafter, at step 66, the UNC uses the minimum Sample Size in transmissions to the MS, thereby avoiding increased delay in transmissions between the MS and the network controller that would result from the use of larger Sample Sizes.

If it is determined at step 63 that the MS is not capable of supporting the minimum Sample Size included in the URR ACTIVATE CHANNEL message, the MS selects a larger Sample Size at step 67. At step 68, the MS sends a URR ACTIVATE CHANNEL ACK message to the UNC with the Sample Size IE set to the selected larger Sample Size. Thereafter, at step 69, the UNC uses the selected larger Sample Size in transmissions to the MS. In this way, less capable MSs are not precluded from channel assignment, and can proceed with the call.

Note that if the MS is capable of using the Sample Size requested by the UNC in the URR ACTIVATE CHANNEL message, it does so. The UNC may request a particular Sample Size for network reasons such as controlling the load on a heavily loaded network. If the MS cannot support the requested Sample Size, it selects a Sample Size as close to the requested Sample Size as possible.

Figure 7:
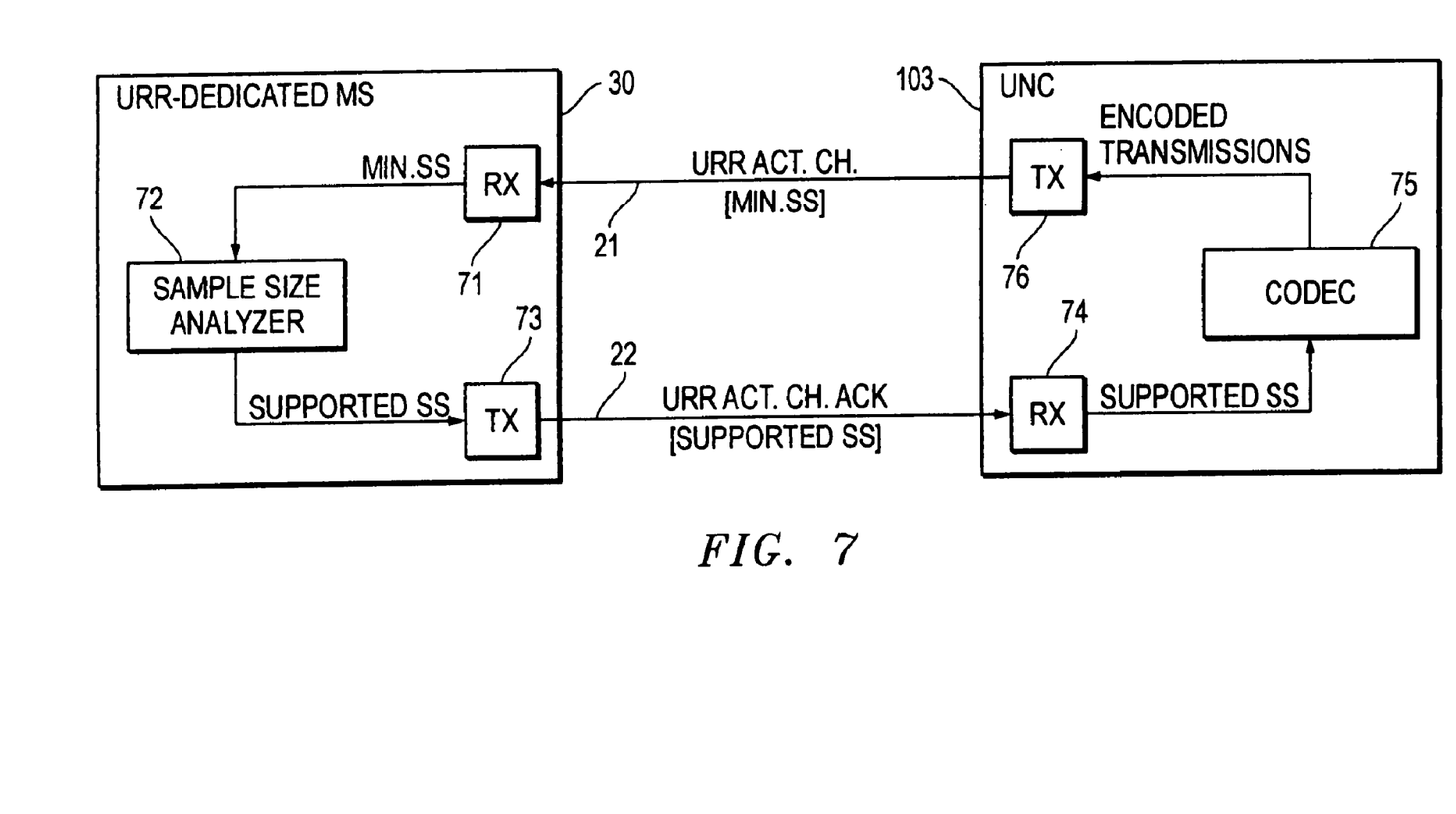
FIG. 7 is a simplified block diagram of an exemplary embodiment of the system of the present invention.

FIG. 7 is a simplified block diagram of an exemplary embodiment of the system of the present invention. The URR-dedicated MS 30 includes a receiver (RX) 71, a Sample Size Analyzer 72, and a transmitter (TX) 73. The UNC 103 includes a receiver (RX) 74, a codec 75, and a transmitter (TX) 76. The MS 30 and the UNC 103, of course, include many other components that are not shown. However, the illustrated components are sufficient to illustrate the operation of the present invention to those skilled in the art.

The UNC 103 transmits a URR ACTIVATE CHANNEL message 21 to the URR-dedicated MS 30, and includes a minimum acceptable Sample Size (Min SS). The MS RX 71 sends the Min SS to the Sample Size Analyzer 72, which determines whether the MS is capable of supporting the minimum Sample Size included in the URR ACTIVATE CHANNEL message. The Sample Size Analyzer sends the lowest Sample Size that the MS can support (Supported SS) to the MS TX 73, which sends the Supported SS to the UNC in a URR ACTIVATE CHANNEL ACK message 22. The UNC RX 74 receives the message and sends the Supported SS to the codec 75. Thereafter, the codec encodes transmissions to the MS using the Supported SS.

Figure 8:
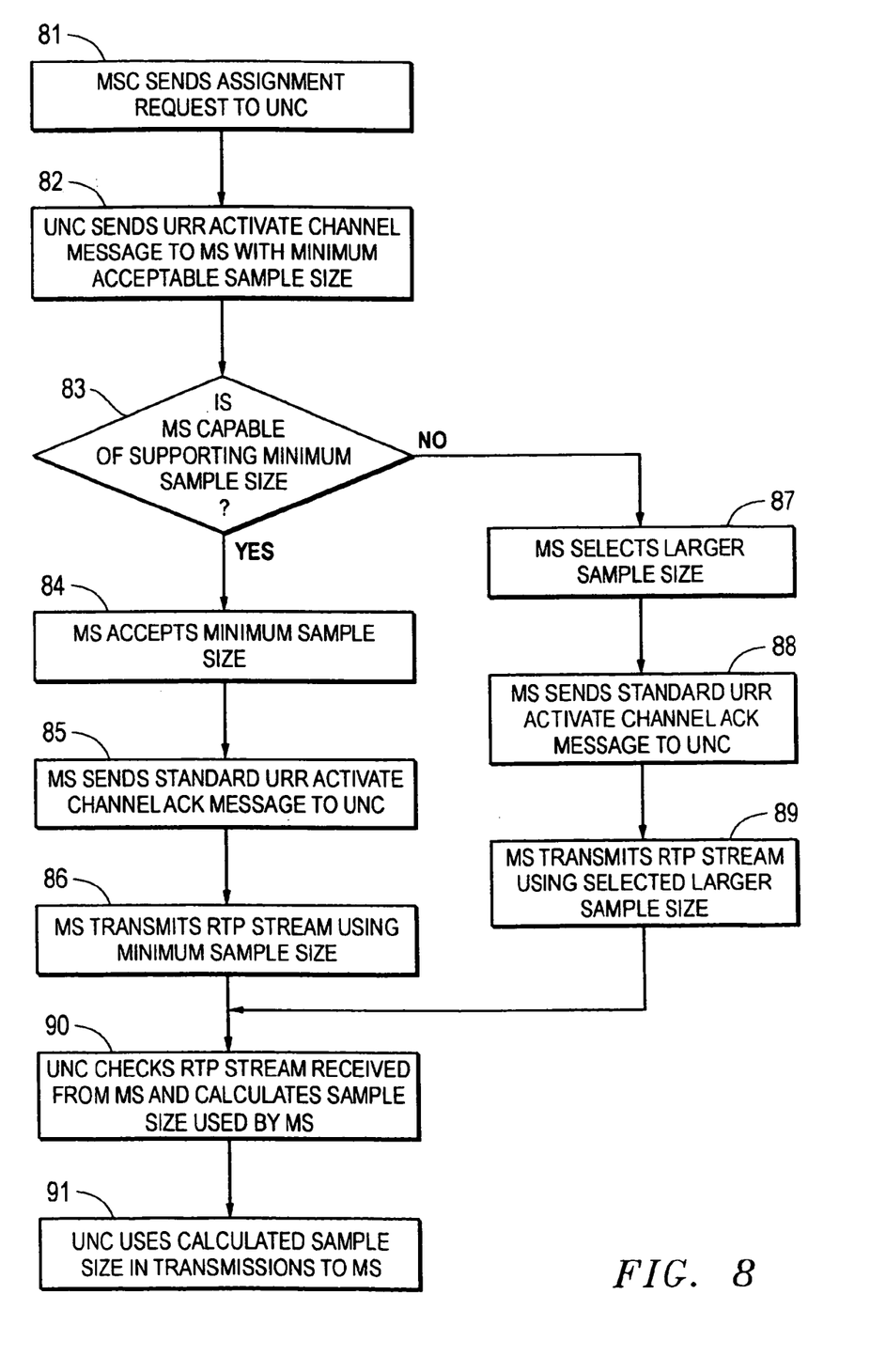
FIG. 8 is a flow chart illustrating the steps of a second exemplary embodiment of a method of initial sample size assignment during channel activation.

FIG. 8 is a flow chart illustrating the steps of a second exemplary embodiment of a method of initial sample size assignment during session establishment. In this embodiment, the MS does not use a Sample Size IE in the URR ACTIVATE CHANNEL ACK message. Instead, the MS sends the ACK message without a Sample Size, and then selects a Sample Size and starts transmitting an RTP stream using the selected Sample Size. The UNC checks the RTP stream received from the MS and calculates the Sample Size being used by the MS. Thereafter, the UNC uses the calculated Sample Size in transmissions to the MS.

The process begins at step 81 where the MSC sends an Assignment Request message to the UNC 103. At step 82, the UNC sends a URR ACTIVATE CHANNEL message to the URR-dedicated MS 30, and includes a minimum acceptable Sample Size. At step 83, the MS determines whether it is capable of supporting the minimum Sample Size included in the URR ACTIVATE CHANNEL message. If so, the MS accepts the minimum Sample Size at step 84 and sends a standard URR ACTIVATE CHANNEL ACK message to the UNC at step 85. At step 86, the MS begins transmitting an RTP stream to the UNC using the minimum sample size.

However, if it is determined at step 83 that the MS is not capable of supporting the minimum Sample Size included in the URR ACTIVATE CHANNEL message, the MS selects a larger Sample Size at step 87. At step 88, the MS sends a standard URR ACTIVATE CHANNEL ACK message to the UNC. At step 89, the MS begins transmitting an RTP stream to the UNC using the selected larger sample size.

At step 90, the UNC checks the RTP stream received from the MS and calculates the sample size being utilized by the MS. Thereafter, at step 91, the UNC uses the calculated Sample Size in transmissions to the MS.

In another embodiment, if the MS is capable of using the Sample Size requested by the UNC in the URR ACTIVATE CHANNEL message, it does so. The UNC may request a particular Sample Size for network reasons such as controlling the load on a heavily loaded network. If the MS cannot support the requested Sample Size, it selects a Sample Size as close to the requested Sample Size as possible. The selected Sample Size may be larger or smaller than the requested Sample Size. For example, suppose the MS can support 2 or 3 voice samples per RTP packet. If the UNC requests 2 voice sample per RTP packet, the MS selects 2 voice samples per RTP packet. If the LNC requests 1 voice sample per RTP packet, the MS selects 2 voice samples per RTP packet because a Sample Size of 2 is the closest Sample Size to the requested Sample Size that the MS can support. Likewise, if the LNC requests 4 voice sample per RTP packet, the MS selects 3 voice samples per RTP packet because a Sample Size of 3 is the closest Sample Size to the requested Sample Size that the MS can support.

In a further aspect of the invention, if the LNC 103 or the MS 30 detects changing network conditions that affect network performance during a session, either side can initiate a negotiation to change parameters used for the ongoing session. For example, they can initiate a negotiation to change the sample size used or to apply redundancy coding. Two messages that already exist in the UMA specifications are modified in the present invention to achieve this purpose: the URR CHANNEL MODIFY message and the URR CHANNEL MODIFY ACK message. These messages currently do not include the sample size parameter. The invention adds the sample size parameter so that the sample size can be changed during an ongoing session.

Figure 9:
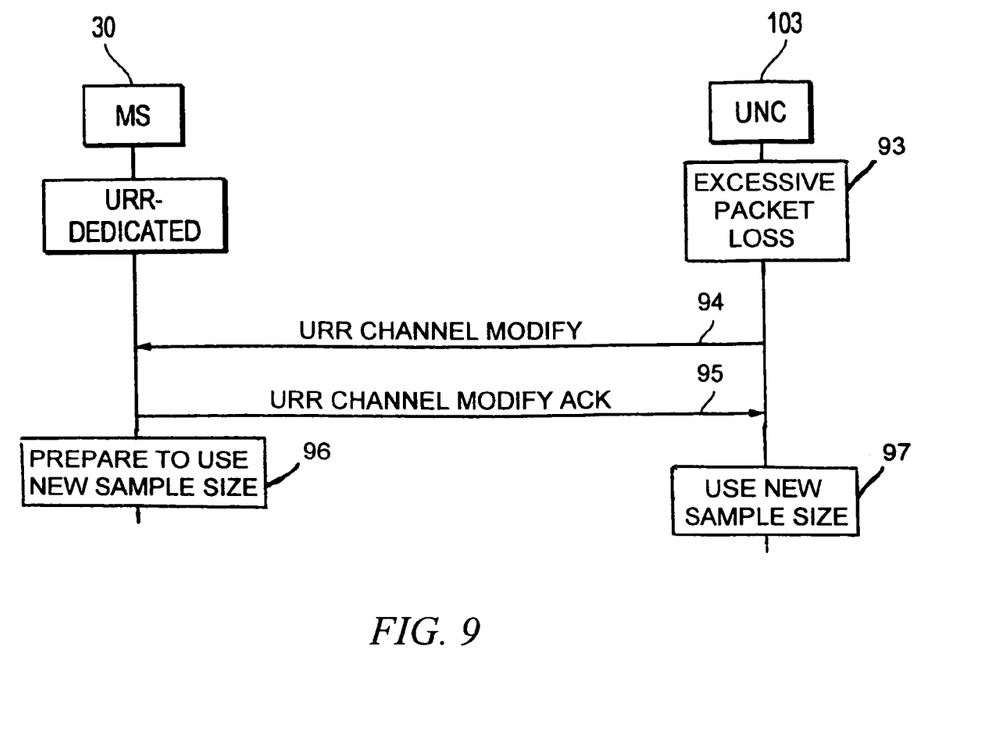
FIG. 9 is a signaling diagram showing the signaling messages sent between the UNC and the MS when an assigned sample size is changed during an ongoing session.

FIG. 9 is a signaling diagram showing the signaling messages sent between the UNC 103 and the MS 30 when the sample size is changed during an ongoing session. If the UNC detects a deteriorating network condition or reduction in network performance related to the session with the MS 30 (for example, as shown at 93, the UNC 103 may detect an excessive packet loss), the UNC sends a URR CHANNEL MODIFY message 94 to the MS suggesting that a larger sample size should be used. If the MS is capable of using the suggested larger sample size, the MS replies with the URR CHANNEL MODIFY ACK message 95 indicating that the suggested larger sample size is acceptable. At 96, the MS then prepares its receiver 71 and transmitter 73 to use RTP with the new sample size. If the MS cannot handle the suggested larger sample size, the MS may either indicate the largest sample size it can handle (and prepare the receiver 71 and transmitter 73 for that size), or reply with the current used frame size. When the UNC receives the URR CHANNEL MODIFY ACK message, the UNC begins at 97 to use the new sample size.

This procedure may also be initiated from the MS if the MS detects changed network conditions that affect the assigned sample size. In one embodiment, the MS simply begins using a proposed sample size. The UNC detects the change in the sample size and begins to use the proposed sample size as well.

It should be noted that the above example involves a scenario in which the detected network performance has decreased, and therefore the UNC and the MS negotiate a larger sample size in order to maintain acceptable performance for the ongoing session. It is also possible that an increase in network performance may be detected, and in order to conserve network resources or release resources for allocation to other users, the UNC and MS may negotiate a smaller sample size for the ongoing session. Obviously, regardless of whether the sample size is increased or decreased, if another change in network conditions is detected during the session, the sample size may again be modified in accordance with the newly detected network conditions. In order to avoid renegotiating the sample size every time a small change is detected, the UNC and MS may renegotiate the sample size only when the change in network performance exceeds a predefined threshold change limit.

These procedures can also be utilized to control other parameters that affect or improve the voice quality of the session. For example, the procedures can be utilized to control whether redundancy coding should be applied, or whether redundant packets should be transmitted. For this purpose, a new information element is included in the URR ACTIVATE CHANNEL message, the URR CHANNEL MODIFY message, and their respective ACK messages indicating if and to what extent redundancy coding and transmissions should be used. The Redundancy Info IE may indicate exactly how redundancy coding should be applied, or alternatively may define a rule set for the application of redundancy coding. For example, the Redundancy Info IE may specifically indicate that the session should use Adaptive Multi-Rate (AMR) speech coding with 4.75 kbit/s and Forward Error Correction (FEC). The end points may negotiate to arrive at a combination that both sides can handle. Alternatively, for the rule set case, the Redundancy Info IE may merely indicate the rules for changing the redundancy coding. Thus, all of the changes do not have to be signaled on the control plane. Instead, the changes are determined locally in the MS and the voice codec on the network side.

In one example, a Multi-rate Configuration IE defines a number of AMR modes that can be used during a voice session, such as AMR 12.2 (12.2 kbit/s) or AMR 4.75 (4.75 kbit/s). A request to change the AMR codec mode is signaled in-band in a 'Codec Mode Request' (CMR). Within the MS and the UNC/Media Gateway (MGW), the change in the AMR mode can be tied to an associated redundancy coding. For example, AMR 12.2 has been associated with no redundancy coding, and AMR 4.75 has been associated with redundancy coding using the Redundancy Info IE. The URR CHANNEL ACTIVATE message or URR CHANNEL MODIFY message and their respective ACK messages with the Redundancy Info IE are used to define the associations so that if a certain frame loss rate is detected in the MS or network codec, the session should begin using AMR 4.75 and redundancy coding. Rules controlling when to change the codec mode, and thereby redundancy (i.e., thresholds and hysteresis) may be signaled as well or may be predetermined. Note that both the MS and network sides are prepared for this change, because it was negotiated earlier, and so the specifics of the change do not need to be signaled on the control plane.

Information elements in the modified URR CHANNEL MODIFY message include all of the information elements from the URR ACTIVATE CHANNEL message. These information elements include:

Channel Mode (already included);
Sample Size (as described above);

Redundancy Info IE (as described above);

IP Address, to move the session to another IP interface/Media Gateway;

RTP UDP Port, to move the session to another UDP port (in another IP interface/Media Gateway);

Payload Type, to change the Payload Type dynamically;

Multi-rate Configuration, to change all parameters related to a multi-rate speech codec; and RTCP UDP Port, to move the RTCP session to another UDP port (in another IP interface/Media Gateway).

These information elements provide the capability to dynamically change all values indicated during the initial traffic channel activation.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of adapting payload transport between a mobile station and an unlicensed-radio access network controller utilizing the Real-Time Protocol (RTP), said method comprising the steps of:
   (a) establishing an ongoing session between the mobile station and the access network controller, wherein the mobile station and the access network controller utilize an assigned sample size of the payload to be included in each packet;
   (b) detecting by either the mobile station or the access network controller, a change in network performance related to the ongoing session
   (c) in response to the detected change in network performance, negotiating a new sample size between the access network controller and the mobile station, wherein, upon the access network controller detecting the change in network performance, the step of negotiating a new sample size includes the steps of:
      (c1) sending a message from the access network controller to the mobile station with a suggested sample size determined in response to the detected change in network performance, wherein the message is a URR MODIFY CHANNEL message that includes a sample size information element; and
      (c2) receiving an acknowledgment message from the mobile station to the access network controller accepting the suggested sample size, wherein the acknowledgment message is a URR MODIFY CHANNEL ACK message that includes the sample size information element; and
   (d) utilizing the new sample size by the mobile station and the access network controller for the ongoing session.

2. The method of claim 1, wherein the detected change in network performance is a reduction in network performance, and step (c) includes negotiating a larger sample size in response to the detected reduction in network performance.

3. The method of claim 1, wherein the detected change in network performance is an increase in network performance, and step (c) includes negotiating a smaller sample size in response to the detected increase in network performance.

4. The method of claim 1, further comprising the steps of:
   (e) monitoring the network performance throughout the ongoing session; and
   (f) repeating steps (c) and (d) each time a change in network performance is detected.

5. The method of claim 4, wherein step (f) includes repeating steps (c) and (d) only when the detected change in network performance exceeds a threshold change limit.

6. The method of claim 1, wherein the mobile station detects the change in network performance, and step (c) includes:
   (c1) determining the new sample size by the mobile station;
   (c2) transmitting packets from the mobile station to the access network controller utilizing the new sample size;
   (c3) detecting the new sample size by the access network controller; and
   (c4) accepting the new sample size by the access network controller.

7. The method of claim 1, wherein step (a) includes the steps of:
   (a1) receiving in the mobile station, a channel activation message from the access network controller, said channel activation message including a minimum acceptable sample size; and
   (a2) if the mobile station is capable of supporting communications utilizing the minimum acceptable sample size, sending an acknowledgment message from the mobile station to the access network controller accepting the minimum acceptable sample size as the assigned sample size to be utilized by the controller for transmissions to the mobile station.

8. The method of claim 1, further comprising the steps of:
   (e) in response to the detected change in network performance, determining that a change in redundancy coding of the packets is required; and
   (f) applying to subsequent packets transmitted during the ongoing session, redundancy coding in accordance with the determined change.

9. The method of claim 8, further comprising, after step (e), signaling the change in redundancy coding by transmitting specific redundancy coding parameters between the mobile station and the access network controller.

10. The method of claim 8, wherein the mobile station and the access network controller are configured with a set of redundancy coding rules, and step (e) includes determining by the mobile station and the access network controller, the change in redundancy coding in accordance with the redundancy coding rules.

11. The method of claim 10, wherein the redundancy coding rules associate redundancy coding with particular Adaptive Multi-Rate (AMR) modes, which are selected in response to the detected change in network performance.

12. The method of claim 11, wherein the redundancy coding rules also specify a threshold level of change and associated hysteresis value required in the network performance to trigger a change in AMR mode or a change in redundancy coding.

13. The method of claim 1, further comprising the steps of:
   (e) in response to the detected change in network performance, determining that redundant packets should be transmitted; and
   (f) transmitting redundant packets for subsequent packets transmitted during the ongoing session.

14. A mobile station adapted to access an unlicensed-radio access network controller utilizing the Real-Time Protocol (RTP), said mobile station comprising:
   means for establishing an ongoing session with the access network controller utilizing an initial sample size of a payload to be included in each packet;

means for negotiating a new sample size with the access network controller in response to a change in network performance related to the ongoing session;

means for utilizing the new sample size for the ongoing session;

means for determining that a chance in redundancy coding of the packets is reguired in response to a change in network performance; and means for applying to subsequent packets transmitted during the ongoing session, redundancy coding in accordance with the determined change.

15. The mobile station of claim 14, wherein the access network controller detects the change in network performance, and the means for negotiating a new sample size includes:

means for receiving a message from the access network controller with a suggested sample size;

means for determining whether the mobile station supports communications utilizing the suggested sample size; and means, responsive to a determination that the mobile station supports communications utilizing the suggested sample size, for sending an acknowledgment message to the access network controller accepting the suggested sample size.

16. The mobile station of claim 14, wherein the mobile station further comprises:

means for detecting the change in network performance;

means for determining the new sample size in response to the change in network performance; and means for transmitting packets to the access network controller utilizing the new sample size.

17. An unlicensed-radio access network controller adapted to establish an ongoing session with a mobile station utilizing a packet-based transmission protocol, said controller comprising:

means for determining an initial sample size of a payload to be included in each packet;

means for negotiating a new sample size with the mobile station in response to a change in network performance related to the ongoing session, wherein the means for negotiating a new sample size includes:

means for sending a message from the access network controller to the mobile station with a suggested sample size determined in response to the detected change in network performance, wherein the message is a URR MODIFY CHANNEL message that includes a sample size information element; and means for receiving an acknowledgment message from the mobile station to the access network controller accepting the suggested sample size, wherein the acknowledgment message is a URR MODIFY CHANNEL ACK message that includes the sample size information element; and means for utilizing the new sample size for the ongoing session.

18. The unlicensed-radio access network controller of claim 17, further comprising:

means for detecting the change in network performance; and means for determining the new sample size in response to the change in network performance.

19. The unlicensed-radio access network controller of claim 18, wherein the means for negotiating a new sample size includes:

means for sending a message to the mobile station with the new sample size; and means for receiving an acknowledgment message from the mobile station accepting the new sample size.

20. The unlicensed-radio access network controller of claim 17, wherein the mobile station detects the change in network performance, and the means for negotiating a new sample size includes:

means for receiving packets from the mobile station utilizing the new sample size;

means for detecting the new sample size utilized by the mobile station; and means for sending subsequent packets to the mobile station utilizing the new sample size.

21. A method of adapting payload transport between a mobile station and an unlicensed-radio access network controller utilizing the Real-Time Protocol (RTP), said method comprising the steps of:

negotiating during channel activation, an initial sample size of the payload to be included in each packet, wherein the step of negotiating an initial sample size includes:

sending from the access network controller to the mobile station, a URR ACTIVATE CHANNEL message that includes a sample size information element; and receiving from the mobile station, a URR ACTIVATE CHANNEL ACK message that includes the sample size information element;

monitoring network performance during an ongoing session between the mobile station and the access network controller; and upon detecting a change in network performance, negotiating a new sample size, wherein the step of negotiating a new sample size includes:

sending from the access network controller to the mobile station, a URR MODIFY CHANNEL message that includes a sample size information element; and receiving from the mobile station, a URR MODIFY CHANNEL ACK message that includes the sample size information element.

22. The method of claim 21, wherein the step of negotiating a new sample size upon detecting a change in network performance includes negotiating a new sample size only when the network performance changes by an amount that exceeds a predefined threshold amount.

* * * * *

UNITED STATES PATENT AND TRADEMARK OFFICE
CERTIFICATE OF CORRECTION

PATENT NO.        : 7,266,106 B2
APPLICATION NO.   : 10/977684
DATED             : September 4, 2007
INVENTOR(S)       : Nylander et al.

It is certified that error appears in the above-identified patent and that said Letters Patent is hereby corrected as shown below:

In Column 7, Line 20, delete "LNC" and insert -- UNC --, therefor.

In Column 7, Line 24, delete "LNC" and insert -- UNC --, therefor.

In Column 7, Line 29, delete "LNC" and insert -- UNC --, therefor.

In Column 11, Line 6, in Claim 14, delete "chance" and insert -- change --, therefor.

In Column 11, Line 7, in Claim 14, delete "reguired" and insert -- required --, therefor.

Signed and Sealed this

Seventeenth Day of June, 2008

JON W. DUDAS
*Director of the United States Patent and Trademark Office*